(12) United States Patent
Iwasaki et al.

(10) Patent No.: US 8,979,967 B2
(45) Date of Patent: Mar. 17, 2015

(54) FILTER DEVICE FOR GAS

(71) Applicants: Nikki Co., Ltd., Kanagawa-ken (JP); Tokyo Roki Co., Ltd., Yokohama (JP)

(72) Inventors: Masashi Iwasaki, Kanagawa-ken (JP); Yuka Yorita, Kanagawa-Ken (JP); Koji Kawayoko, Kanagawa-Ken (JP); Takaya Kohara, Kanagawa-Ken (JP); Tomoaki Fukuoka, Kanagawa-Ken (JP); Takatsugu Kurosawa, Kanagawa (JP); Tadashi Ichikawa, Kanagawa (JP); Yoshinori Maehira, Kanagawa-Ken (JP); Takayuki Idehara, Kanagawa (JP)

(73) Assignees: Nikki Co., Ltd., Atsugi (JP); Tokyo Roki Co., Ltd., Tsuzuki (JP)

(*) Notice: Subject to any disclaimer, the term of this patent is extended or adjusted under 35 U.S.C. 154(b) by 137 days.

(21) Appl. No.: 13/749,425

(22) Filed: Jan. 24, 2013

(65) Prior Publication Data

US 2014/0059984 A1 Mar. 6, 2014

(30) Foreign Application Priority Data

Aug. 31, 2012 (JP) ................................ 2012-192578

(51) Int. Cl.
| | | |
|---|---|---|
| *B01D 46/00* | (2006.01) | |
| *F02M 35/024* | (2006.01) | |
| *B01D 46/24* | (2006.01) | |
| *F02M 21/02* | (2006.01) | |

(52) U.S. Cl.
CPC ..... *F02M 35/02483* (2013.01); *B01D 46/0004* (2013.01); *B01D 46/0047* (2013.01); *B01D 46/0002* (2013.01); *B01D 46/2411* (2013.01); *B01D 46/24* (2013.01); *F02M 21/0212* (2013.01); *F02M 21/0218* (2013.01); *Y02T 10/32* (2013.01)

USPC .............................................. 55/503; 55/498

(58) Field of Classification Search
CPC .......... B01D 46/0002; B01D 46/0004; B01D 46/0047; B01D 46/24; B01D 46/2411; F02M 35/02483
USPC ..................................................... 55/498, 503
See application file for complete search history.

(56) References Cited

U.S. PATENT DOCUMENTS 6,638,330 B1* 10/2003 Bergami ...................... 55/315.1
7,637,972 B2* 12/2009 Bergami ........................ 55/321

FOREIGN PATENT DOCUMENTS

| JP | 07-328364 | 12/1995 |
|---|---|---|
| JP | 2009-114996 | 5/2009 |
| JP | 2011-245442 | 12/2011 |

* cited by examiner

*Primary Examiner* — Robert Clemente
(74) *Attorney, Agent, or Firm* — Rader, Fishman & Grauer PLLC (57) ABSTRACT

There is provided a filter device for gas including: a cylindrical filter case formed to be airtight; a hollow filter which is formed with an opening in a bottom part thereof, a top part of which is obstructed, and which is placed inside the filter case in such a manner that a central axis thereof substantially aligns with a central axis of the filter case; and a flow controlling plate which is attached roundly between an outlet in the top part of the filter case and the top part of the hollow filter on an inner peripheral wall of the filter case, wherein gas introduced through an inlet in a bottom part of the filter case is introduced into a hollow part of the hollow filter, and also passes through a space between an outer periphery of the hollow filter and the inner peripheral wall of the filter case, and then is discharged through the outlet.

2 Claims, 7 Drawing Sheets

FILTER DEVICE FOR GAS

BACKGROUND

1. Technical Field

The present invention relates to a filter device for gas that is used while being connected to a fuel flow path on the intake side of a gas engine operating with gas fuel such as liquefied petroleum gas (LPG) and compressed natural gas (CNG), for example.

2. Related Art

Conventionally, in a gas engine that uses gas fuel such as LPG and CNG, it is known that fuel residue of impurities in oil form caused by tar contained in gas fuel in mist form, plasticizer eluted from a hose, or the like (referred to as "fuel residue", hereinafter) flows into an injector on the downstream side, resulting in adverse effect on the injector function.

Therefore, as a means of preventing such fuel residue being mixed into an engine, a means of preventing the fuel residue being mixed into an injector or an engine is by providing a filter device for gas in the middle of the fuel flow path.

For example, there is a known filter device for gas disclosed in Japanese Laid-Open Patent Publication No. 7-328364 that includes: a cylindrical filter case; a hollow filter that is also cylindrical and provided inside the filter case; and an inlet and an outlet on the top part of the filter case. The filter device for gas is configured in such a manner that gas flowing in from the inlet passes the inside of the filter case, passes through the hollow filter, flows into a space outside of the hollow filter, and then is discharged to the outlet.

In addition, there is a known filter device for gas disclosed in Japanese Laid-Open Patent Publication No. 2011-245442 configured in such a manner that gas flowing into a filter case from an inlet is filtered by a hollow filter provided in the filter case, and the gas that has passed inside the hollow filter is discharged through an outlet.

As described above, a way that gas flows from an inlet to an outlet in the conventional filter devices for gas can roughly fall into a type where gas passes from the inside of the cylindrical hollow filter to the outside thereof, and a type where gas flowing into the filter case flows from the outside of the hollow filter into the inside thereof through the filter and is discharged.

In Japanese Laid-Open Patent Publication No. 2011-245442 disclosing a filter device for gas of the latter type, there is a known filter device for gas capable of efficiently trapping gas flowing inside the filter case on the hollow filter by providing a flow controlling plate that controls a flow of gas flowing into the inlet as a filter device for gas that extends life of the hollow filter by efficiently contacting gas flowing into the filter case to the hollow filter, and by separating impurities.

This filter device for gas is designed in such a manner that gas that has passed through the hollow filter flows to the outlet positioned on one end of the hollow filter in the axial direction. In addition, the outlet has substantially the same inner diameter with the hollow filter, and the flow path is a straight line. Therefore, it is thought that there is no obstacle that distributes flow speed distribution and thus any problem of non-uniformity of the flow speed distribution on the outlet side or the like is not caused.

Figure 3:
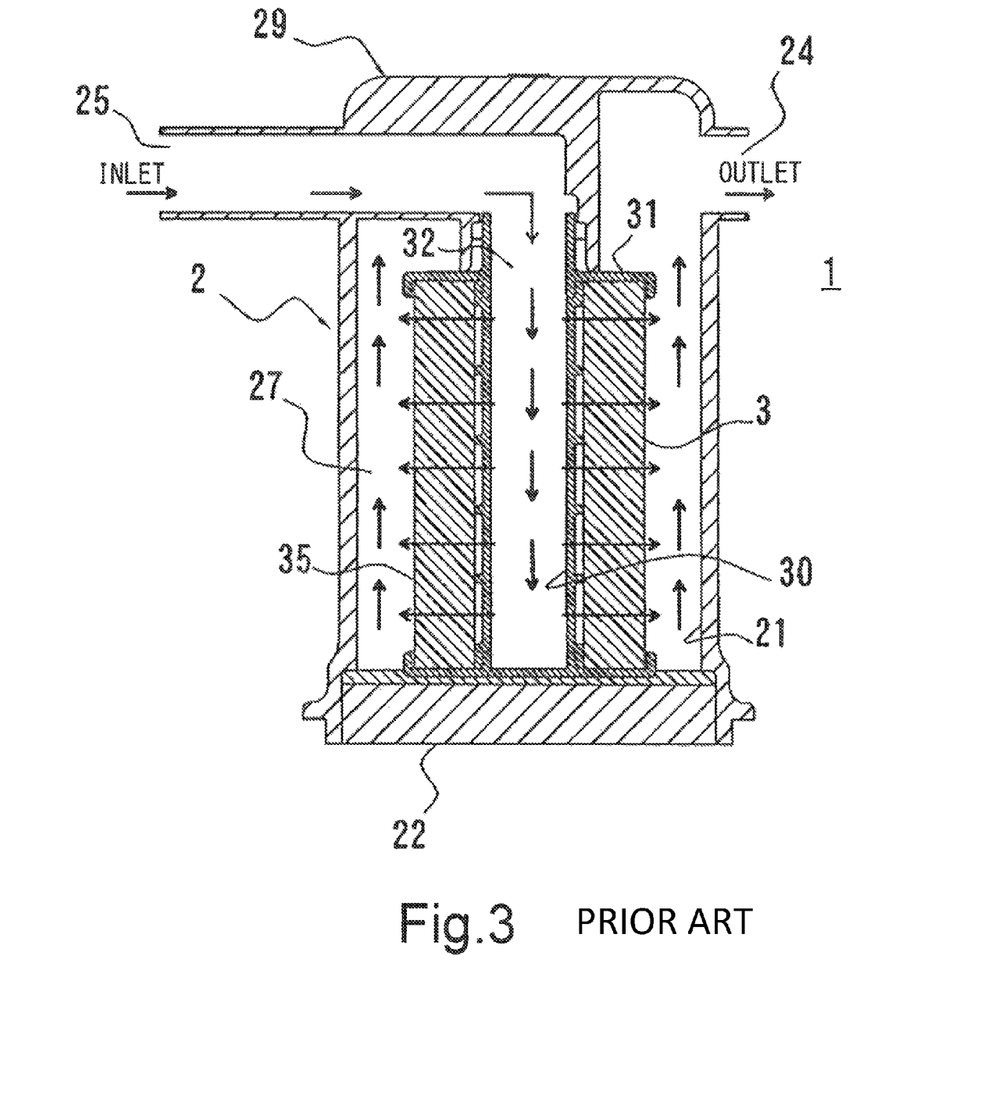
FIG. 3 is a longitudinal sectional view of a conventional filter device for gas.

On the other hand, in a case of a filter device for gas where gas flows in the former way, an outlet 24 is formed to be eccentric as illustrated in FIG. 3. Therefore, non-uniformity occurs in the flow speed distribution of gas at a filter outer peripheral section 35 of a hollow filter 3 or around the outlet 24 (resulting in decrease of trap effect at a part having a high flow speed on the hollow filter 3), and thus liquid of fuel residue or the like attached to an inner peripheral wall 21 of the filter case is discharged to the outlet 24 together with gas at a part having a high flow speed of gas on the inner peripheral wall 21 of the filter case, which is around the outlet 24. Consequently, a failure of an engine system is caused.

In order to solve this problem, there is a known method of providing a communication hole to narrow a flow path, the hole being positioned short of a point connected to an outlet as disclosed in Japanese Laid-Open Patent Publication No. 7-328364, and there is also a known method of providing a space of a predetermined length between a hollow filter and an outlet so as to decrease flow speed and thus decrease an influence of non-uniformity of flow speed distribution as disclosed in Japanese Laid-Open Patent Publication No. 2009-114996.

SUMMARY

However, in the method of providing the communication hole positioned short of the outlet without increasing the size of the filter case to guide gas that has flowed in as disclosed in Japanese Laid-Open Patent Publication No. 7-328364, non-uniformity of the flow speed distribution that is thought to occur at the outer peripheral section of the hollow filter is significant, and it is also thought that the flow speed distribution around the outlet is non-uniform. Therefore, decrease of the trap effect of the hollow filter is caused, and liquid attached to the inner peripheral wall of the filter case flows out together with gas being discharged.

In addition, in the method of extending the space distance between the hollow filter and the outlet as disclosed in Japanese Laid-Open Patent Publication No. 2009-114996, it is thought that there is some extent of effect of decreasing non-uniformity of flow speed distribution, but the filter case has to be large, which causes a problem of limiting a position of the filter device for gas when it is actually mounted in an engine room of a vehicle having a small space for mounting.

Therefore, this invention is made in view of these conventional problems and an object thereof is to provide a filter device for gas capable of solving the problem that liquid attached to the inner wall of the filter case is discharged together with gas by decreasing non-uniformity of flow speed distribution of gas flowing on the hollow filter outer peripheral section and around the outlet, and capable of providing flexibility of a layout when it is mounted on a vehicle.

The invention made to solve the problems includes: a cylindrical filter case formed to be airtight; a hollow filter which is formed with an opening in a bottom part thereof, a top part of which is obstructed, and which is placed inside the filter case in such a manner that a central axis thereof substantially aligns with a central axis of the filter case; and a flow controlling plate which is formed with a flow controlling opening in a center thereof and which is attached roundly between an outlet provided in the top part of the filter case and the top part of the hollow filter on an inner peripheral wall of the filter case, wherein gas made to flow through an inlet provided in a bottom part of the filter case is introduced into a hollow part (first chamber) of the hollow filter, and also passes through a space formed between an outer periphery of the hollow filter and the inner peripheral wall of the filter case, and then is discharged through the outlet.

Therefore, in this filter device for gas as the present invention, gas that has passed through the hollow filter is delivered into a space (second chamber) formed between the filter outer periphery and the inner peripheral wall of the filter case, and flows toward the outlet.

At this time, since the flow controlling plate is attached roundly between the outlet and the top part of the hollow filter on the inner peripheral wall of the filter case, it is possible to prevent non-uniformity of speed distribution occurring on the hollow filter outer peripheral section, on the inner wall surface of the filter case, or around the outlet.

In addition, in the present invention, both of the filter case and the hollow filter are preferably cylindrical. Further, a flow controlling opening of the flow controlling plate has an opening area that is larger than a minimum opening area of the outlet provided in the top part of the filter case and that is smaller than an inner cross sectional area of the filter case, and a flow controlling opening of the flow controlling plate more preferably has an opening area that is more than twice a minimum opening area of the outlet and that is smaller than an inner cross sectional area of the filter case.

In addition, according to the configuration described above, the filter device for gas is configured with the filter case for housing the hollow filter and a lid that is provided with the outlet positioned on the top part in substantially lateral direction.

According to the present invention, non-uniformity of flow speed distribution occurring on the hollow filter outer peripheral section, on the inner peripheral wall of the filter case, and around the outlet can be decreased. In addition, the outlet can be positioned in any direction on the top part of the filter case without considering non-uniformity of flow speed distribution, and thus a filter device for gas having flexibility of a layout when it is mounted on a vehicle can be provided.

DETAILED DESCRIPTION

Embodiments of the present invention is described referring to the drawings hereinafter.

First, a configuration of whole of a filter device for gas according to this embodiment will be described.

Figure 1:
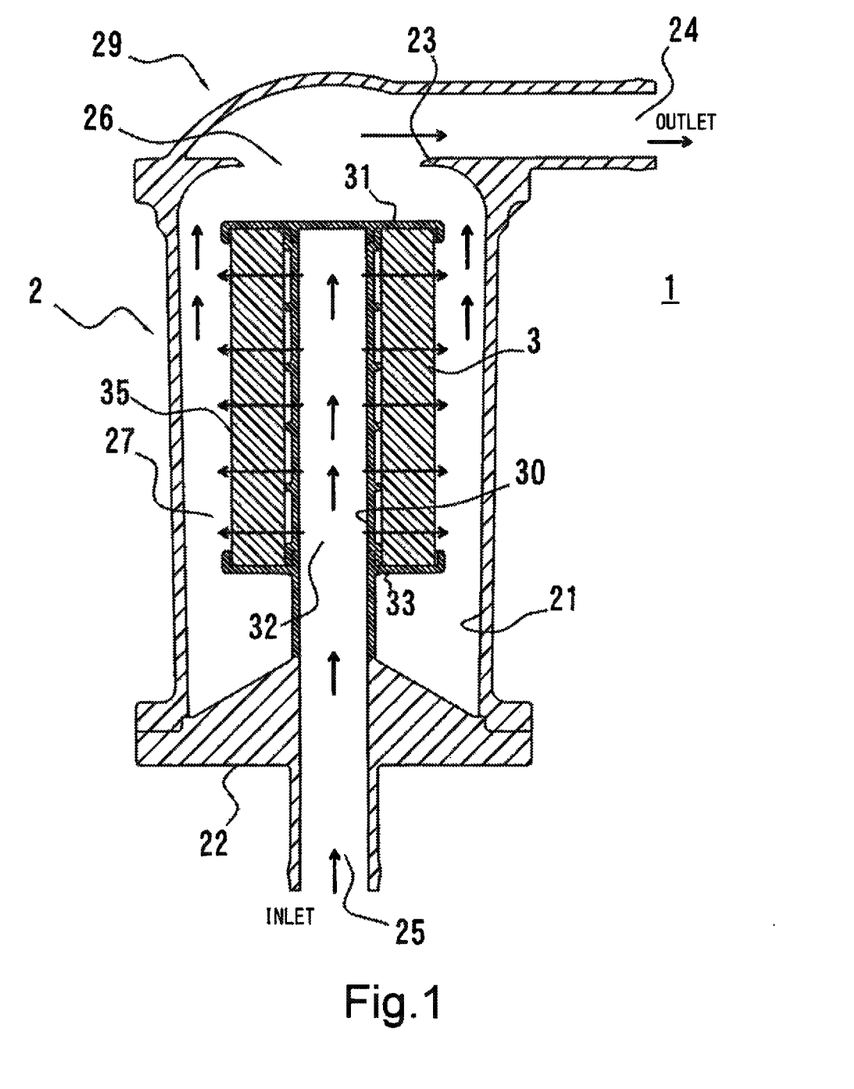
FIG. 1 is a longitudinal sectional view of a filter device for gas according to the present invention.

FIG. 1 is a longitudinal sectional view of the filter device for gas according to this embodiment. Gas fuel such as LPG and CNG regulated to a predetermined pressure is made to flow into the filter device for gas 1 to trap fuel residue contained in the gas fuel so as to clean the gas. The filter device for gas 1 is used to supply the thus cleaned gas fuel to an engine by delivering it to an injector on the downstream side.

This filter device for gas 1 includes: a cylindrical filter case 2 formed to be airtight; and a hollow filter 3 formed with an opening in a bottom part 33 and obstructed with an end plate 31 on the top side, the hollow filter being placed inside the cylindrical filter case 2 in such a manner that the central axis of the hollow filter 3 aligns with the position of the central axis of the filter case 2.

Gas fuel that is made to flow through an inlet 25 provided in a bottom part 22 of the filter case 2 is introduced to a first chamber of the hollow filter 3.

The gas fuel reached to the first chamber 32 on the side of an inner cylinder 30 of the hollow filter 3 passes a filtration section of the hollow filter 3 to be filtered, passes through a space (second chamber) 27 formed between a filter outer peripheral section 35 and an inner peripheral wall 21 of the filter case 2, discharged through an outlet 24 provided in a lid 29 of the filter case 2, and delivered to the injector (not shown).

In the filter device for gas 1 according to this embodiment, a flow controlling plate 23 formed with a flow controlling opening 26 at the center thereof is circularly attached to the inner peripheral wall 21 of the filter case 2 in the second chamber 27 positioned short of the outlet 24, and between an end plate 31 of the hollow filter 3 and the outlet 24. The flow controlling plate 23 reduces non-uniformity of flow speed distribution of gas flowing out from the hollow filter 3, and prevents fuel residue from flowing out from the outlet 24 together with gas.

Next, respective sections constituting the filter device for gas according to this embodiment will be described in detail.

The filter case 2 is provided with a fixing section, which fixes the filter case 2 to a vehicle, in a cylindrical cylinder. As to a material for the filter case, the filter case is desirably molded from a resin, but other materials can be used as long as airtightness and pressure resistance can be secured. In this embodiment, a functional plastic having airtightness and pressure resistance that is conventionally used for this type of filter case was used.

In this embodiment, the lid 29 provided with the outlet 24 in lateral direction is attached to the top opening of the cylindrical filter case 2 having a bottom.

This lid 29 is a lid that is fitted to the filter case 2, and provided with the outlet 24 in lateral direction. The material of the lid is selected considering pressure resistance and airtightness. In this embodiment, the lid was molded from the same material with the filter case 2.

In this embodiment, vibration welding is used as a way of fitting the lid 29 to the filter case 2, but other ways may be appropriately selected depending on material to be used as long as airtightness and pressure resistance can be secured.

Figure 5:
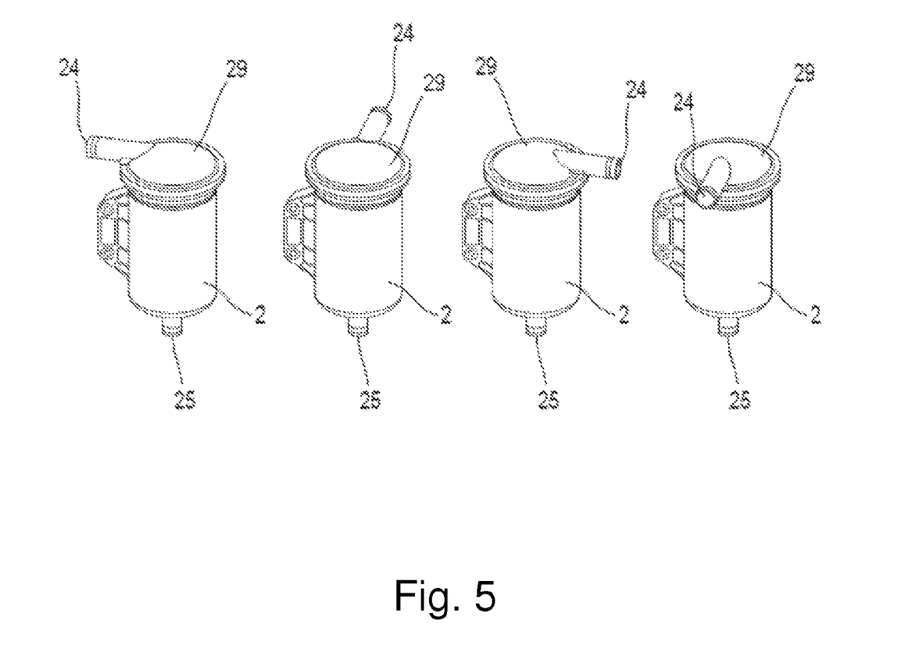
FIG. 5 is a layout position pattern view of an outlet of the filter device for gas according to the present invention.

As illustrated in FIG. 5, the lid 29 can be mounted to position the outlet 24 in any direction in 360 degrees without considering an influence of the flow speed distribution of gas, and thus the position can be determined considering the layout of the whole engine system to which the filter device for gas 1 is mounted, for example.

Then, the flow controlling plate 23 of this embodiment is molded from the same material with the filter case 2 and the lid 29, and circularly attached to inner peripheral wall of the filter case 2 at the position prescribed above.

This flow controlling plate 23 is usually mounted with the lid 29 removed therefrom.

Figure 2A:
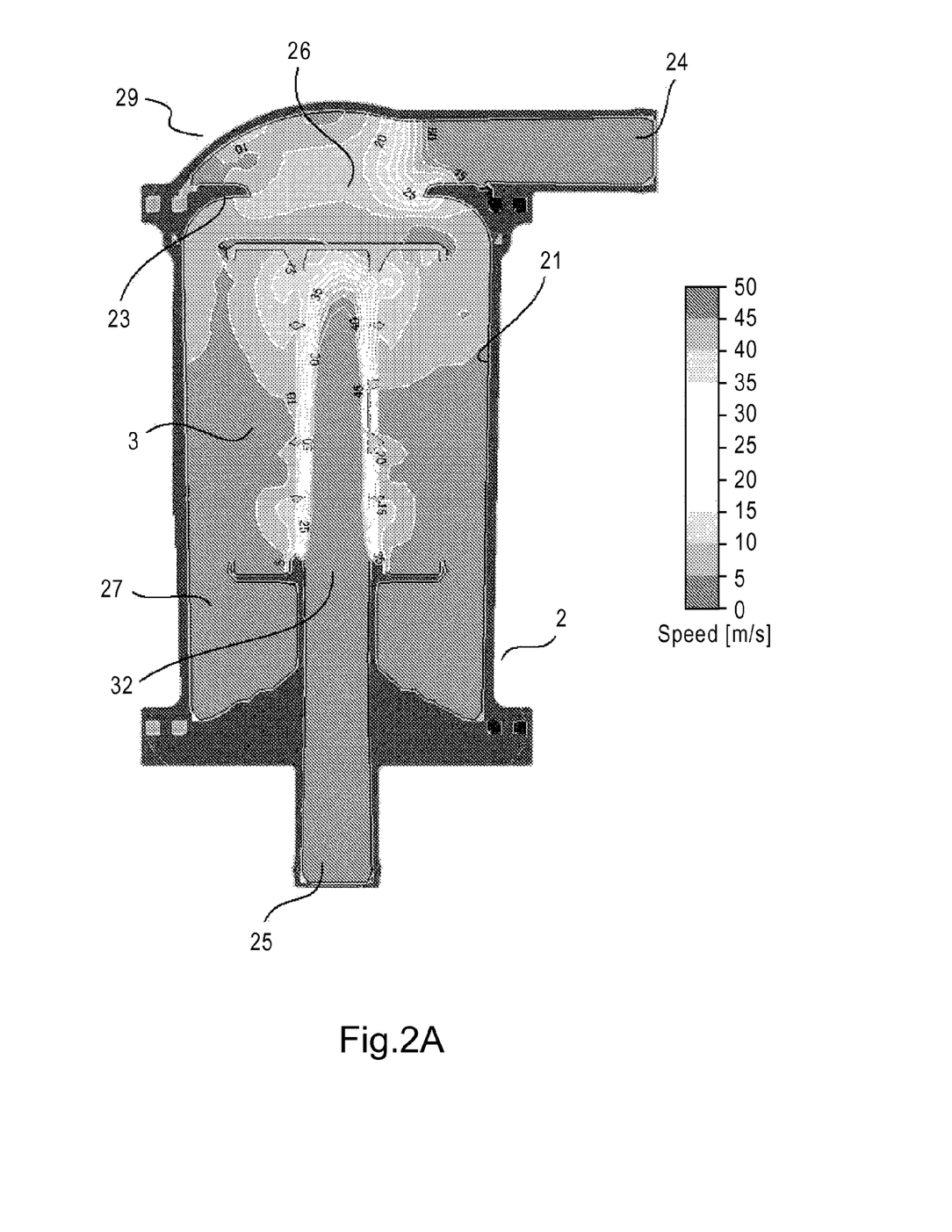
FIG. 2A is a flow speed distribution view on a longitudinal plane of the filter device for gas according to the present invention.
Figure 2B:
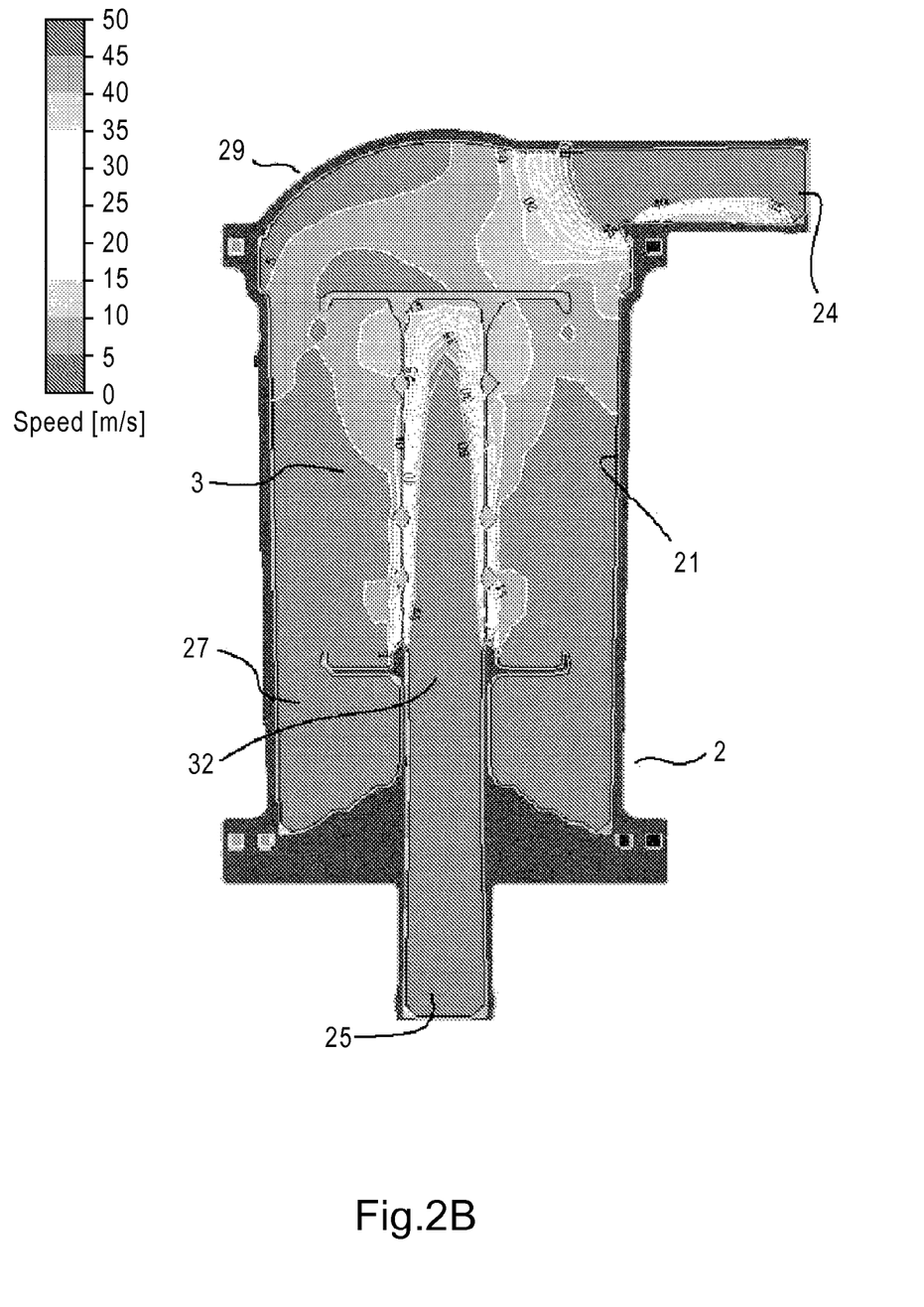
FIG. 2B is a flow speed distribution view on a longitudinal plane when a flow controlling plate 23 is removed from the filter device for gas according to the present invention.
Figure 2C:
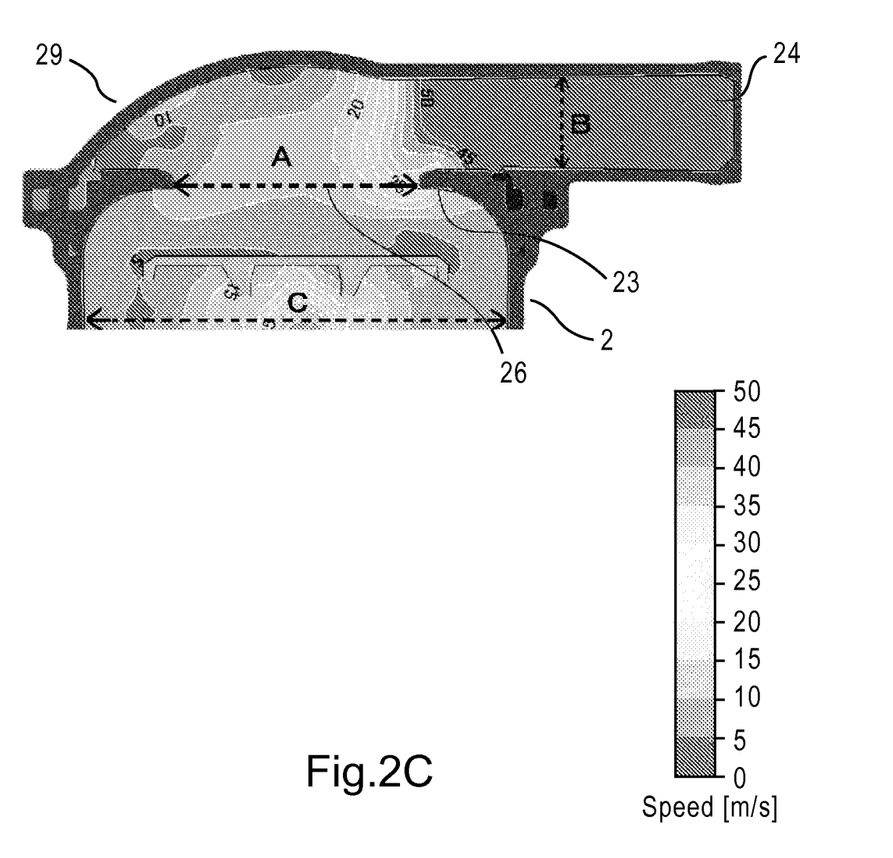
FIG. 2C is a partially enlarged view, at the part of the flow controlling plate, of the flow speed distribution view on the longitudinal plane of the filter device for gas according to the present invention.

As to the flow controlling plate 23, the size of the flow controlling opening 26 positioned at the center of the flow controlling plate 23 as illustrated in FIG. 2C is an issue.

The opening area of the flow controlling opening 26 may be appropriately regulated depending on the size or an intended use of the filter device for gas 1 to be used (mounted). In principle, when the size of the flow controlling opening 26 is smaller, an effect of flow control increases, but a pressure loss of the flow path is caused.

Therefore, in this embodiment, the position was regulated so that an effect of flow control was provided while a pressure loss was suppressed as much as possible. The specific size of the flow controlling opening 26 was determined by measuring and in computer simulation by using an approach of computation fluid dynamics and regulated.

As a result, it was found out that, it is preferable for the purpose of preventing non-uniformity of flow speed and of preventing a pressure loss that the opening area of the flow controlling opening having a diameter "A" illustrated with a chain line in FIG. 2C be at least twice the area of the minimum opening area of the outlet 24 having a diameter "B" illustrated by a chain line in FIG. 2C, and be at most the inner cross sectional area of the filter case 2 having a diameter "C" illustrated with a chain line in FIG. 2C in this embodiment.

Next, the effect of flow control of the filter device for gas according to this embodiment was compared with a conventional filter for gas without a flow controlling plate.

Figure 4:
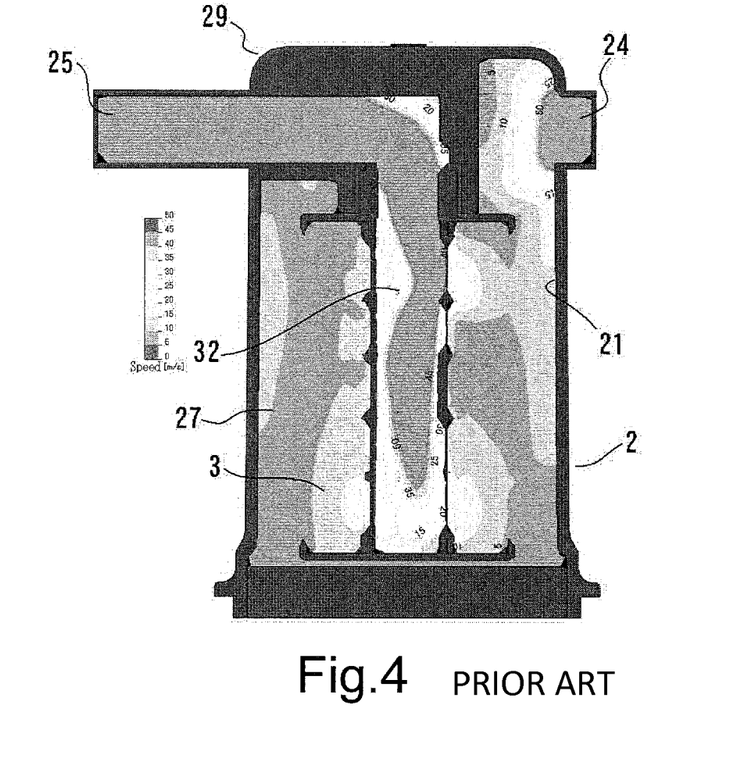
FIG. 4 is a flow speed distribution view on a longitudinal plane of the conventional filter device for gas.

FIG. 4 illustrates a case where the conventional filter device for gas is used. The flow speed of gas that has flown into the hollow filter through the inlet 25 has a tendency of increasing the flow speed at the circumference of the outlet 24 of the filter case 2 in the second chamber, and especially on the inner peripheral wall 21.

Therefore, this high flow speed at the circumference of the inner peripheral wall 21 is thought to be the cause of rolling up fuel residue, which was escaped from the hollow filter 3 and adheres to the inner peripheral wall 21, to the outlet 24.

In addition, since the flow speed distribution is indicated as a marble pattern in the conventional filter device for gas, the flow speed is non-uniform in the whole of the case including the circumference of the hollow filter 3 and the circumference of the outlet, which is thought to be a cause of decreasing the trap effect of the hollow filter 3 due to flow speed differences.

Further, FIG. 2A illustrates the flow speed distribution inside the filter case 2 of the filter device for gas having the flow controlling plate 23 mounted between the filter case 2 and the lid 29 as this embodiment. This flow speed distribution was compared with the flow speed distribution inside the filter case of the filter device for gas illustrated in FIG. 2B that has the same configuration with this embodiment except for a point that the flow controlling plate 23 is not attached.

As a result, in the filter device for gas of this embodiment (FIG. 2A) with the flow controlling plate 23 attached thereto, the flow speed distribution of gas discharged through the hollow filter 3 to the second chamber 27 on the outer peripheral surface of the hollow filter 3 was substantially uniform along the longitudinal plane compared to the filter device without the flow controlling plate 23 (FIG. 2B).

As a result, the decrease of the trap effect of the hollow filter 3 caused by the non-uniformity of the flow speed distribution was resolved, and an issue that fuel residue attached to the inner peripheral wall 21 of filter case 2 is discharged together with the gas fuel flowing into the outlet 24 was resolved.

Further, since the flow speed of gas that has passed through the flow controlling plate 23 is stabilized due to the effect of the flow controlling plate 23, there is no need to consider the flow speed distribution to determine a direction of discharging gas. Therefore, the filter device for gas can be positioned flexibly regarding to the direction of the outlet 24 as illustrated in FIG. 5 depending on the relation with a layout of other engine parts.

As described above, the filter device for gas according to the present invention is capable of decreasing non-uniformity of flow speed distribution occurring on the outer peripheral section of the filter, on the inner peripheral wall of the filter case, and around the outlet, and capable of providing flexibility of a layout to be mounted on a vehicle.

What is claimed is:

1. A filter device for gas comprising:
a cylindrical filter case formed to be airtight;
a hollow filter which is formed with an opening in a bottom part thereof, a top part of which is obstructed, and which is placed inside the filter case in such a manner that a central axis thereof substantially aligns with a central axis of the filter case; and
a flow controlling plate which is formed with a flow controlling opening in a center thereof and which is attached roundly between an outlet provided in the top part of the filter case and the top part of the hollow filter on an inner peripheral wall of the filter case, wherein
gas made to flow through an inlet provided in a bottom part of the filter case is introduced into a hollow part of the hollow filter, and also passes through a space formed between an outer periphery of the hollow filter and the inner peripheral wall of the filter case, and then is discharged through the outlet,
wherein the filter device for gas is configured with the filter case for housing the hollow filter and a lid that is provided with the outlet positioned on the top part in substantially lateral direction and that is fitted to the filter case to be airtight.

2. The filter device for gas according to claim 1, wherein the lid attached to the filter case can be positioned freely in any circumferential direction.

* * * * *